United States Patent
Claycomb

(10) Patent No.: US 6,729,604 B1
(45) Date of Patent: May 4, 2004

(54) TRUCK STRAP WINCH REWINDING DEVICE

(76) Inventor: Kenneth R. Claycomb, 16464 Old Frederick Rd., Mont Airy, MD (US) 21771

( * ) Notice: Subject to any disclaimer, the term of this patent is extended or adjusted under 35 U.S.C. 154(b) by 0 days.

(21) Appl. No.: 09/937,046

(22) PCT Filed: Mar. 21, 2000

(86) PCT No.: PCT/US00/07378

§ 371 (c)(1),
(2), (4) Date: Sep. 20, 2001

(87) PCT Pub. No.: WO00/56573

PCT Pub. Date: Sep. 28, 2000

Related U.S. Application Data

(60) Provisional application No. 60/125,579, filed on Mar. 23, 1999.

(51) Int. Cl.[7] .................... B21F 9/00; B25B 25/00; B66F 3/00
(52) U.S. Cl. ............... 254/217; 24/68 R; 24/69 CT; 24/71 ST
(58) Field of Search .................. 254/217, 218; 24/68 R, 70 ST, 69 ST, 69 CT, 71 ST

(56) References Cited

U.S. PATENT DOCUMENTS

| | | | | |
|---|---|---|---|---|
| 389,335 A | * | 9/1888 | Spear ........................ 403/328 |
| 1,797,776 A | * | 3/1931 | Jacobi ........................ 292/352 |
| 3,428,331 A | * | 2/1969 | Morgan et al. ............. 410/100 |
| 3,954,226 A | * | 5/1976 | Pickering .................... 242/395 |
| 4,266,740 A | * | 5/1981 | Ramos et al. ............. 242/532.6 |
| 4,311,288 A | * | 1/1982 | Galland ................... 242/532.6 |
| 4,390,141 A | * | 6/1983 | Webster .................... 242/404.2 |
| 4,613,273 A | * | 9/1986 | Wagner ...................... 414/463 |
| 4,900,203 A | * | 2/1990 | Pope ........................... 410/36 |
| 5,255,993 A | * | 10/1993 | Kovacs ........................ 403/328 |
| 5,791,844 A | * | 8/1998 | Anderson ................... 410/103 |
| 5,961,061 A | * | 10/1999 | Stanley ........................ 242/395 |
| 5,975,454 A | * | 11/1999 | Potter et al. ................ 242/395 |

\* cited by examiner

*Primary Examiner*—Emmanuel Marcelo
(74) *Attorney, Agent, or Firm*—Law Offices of Royal W. Craig

(57) ABSTRACT

A device for rewinding a load strap onto a winch of the type typically used to secure loads on flat bed truck trailers. The device includes a spindle (10) with engagement pin (20) that fits inside the winch drum (34) of the existing winch (32) (as commonly found on flat bed truck trailers to secure loads). The engagement pin (20) engages the winch bar holes (36) in winch drum (34). The spindle (10) is fitted with either a large hand crank (28), small hand crank (32) or motor (38) allowing the operator to rapidly and conveniently rewind loose load securing straps that will not be immediately reused to secure a new load onto the load securing winch (32).

8 Claims, 8 Drawing Sheets

TRUCK STRAP WINCH REWINDING DEVICE

This application is a provisional of No. 60/125,579 filed Mar. 21, 2000.

TECHNICAL FIELD

The invention relates to the trucking industry and, more particularly, to the rewinding of load straps of the type used to secure loads on flat bed trucks back onto the winch.

BACKGROUND ART

Typical flat bed trucks employ a number of load straps each coiled onto a winch that are used for securing loads on the flat bed trailer during travel. For instance, a flat bed trailer may have as many as twelve straps each measuring twenty-seven feet in length and coiled onto winch drums positioned along both sides of the flat bed. After these load straps have been unwound and used to secure a load for delivery, they must all be rewound again in order to secure the vehicle for travel. For most drivers, the only way to rewind the load straps is by grasping the round winch drum with one's hand and to twist it using wrist motion. This is exceedingly slow and often causes injury to the forearm over time. The winches are typically mounted directly below and close to the edge of the trailer, often on a track so they can be slid lengthwise along the trailer to optimally position the strap. The mounting of the winch close to the edge of the trailer often leaves very little radial clearance around the winch drum and the positioning along, the trailer may place it very close to another winch or part of the trailer, restricting access directly in front of the axial opening of the winch drum.

There are a variety of tightening bars on the market that are used to tighten winch straps around a load, but these are slow and impractical for rewinding loose straps. The tightening bars must be repeatedly removed and re-inserted for each partial revolution of the winch drum.

For example, U.S. Pat. No. 5,975,454 to Potter (1998) discloses a strap rewinding device that winds up a strap onto a coil. However, the strap has to be fully removed from the load winch and truck before doing so (as shown in FIGS. 6 and 7), and the rewinding device must be stored separately from the winch. This causes inconvenience and makes the device impracticable for the above-described application.

U.S. Pat. No. 4,900,203 to Pope (1988) discloses a winch with a short bar passing through the winch drum to wind the strap. This approach is too slow because one cannot achieve more than one-quarter to one-half turn per bar insertion due to the presence of the trailer edge close to the winch drum. Moreover, the winch of Pope's invention requires use of a specific winch that is not widely used in the today's trucking industry.

U.S. Pat. No. 4,266,740 to Ramos (1980), U.S. Pat. No. 3,954,226 to Pickering (1974), U.S. Pat. No. 4,390,141 to Webster (1981), U.S. Pat. No. 4,311,288 to Gallaund (1980), and U.S. Pat. No. 5,961,061 to Stanley (1998) all disclose winding devices including a crank to wind the strap into a coil, and all require removal of the strap from the winch used to hold the load so that the strap can be rewound onto a separate device. As with Potter '454 supra, drivers elect to wind the straps faster by grasping the extended portion of the winch drum and turning the winch drum using wrist motion.

It would be greatly advantageous to provide a load strap rewinding device that assists drivers in winding load straps back onto the very winches that they were uncoiled from.

DISCLOSURE OF THE INVENTION

It is, therefore, an object of the present invention to provide a truck strap rewinding device for the rewinding of load straps back onto their respective winches.

It is another object to accomplish the foregoing without need for a separate rewinding winch, and to assure rapid and safe storage of the load straps on the very same winches that are used to hold the straps under load. This would eliminate the need for separate rewinding coils as in the prior art, as well as the need for extra storage space to stow the separate coils between uses.

It is another object to provide a load strap rewinding device that saves several minutes per load thus increasing a driver's productivity It is still another object to provide a load strap rewinding device that operates by physical hand and arm motions that are more natural and easier than twisting the winch drum by hand, thereby saving considerable physical effort and wear and tear on the driver.

It is another object to encourage drivers to use extra load strap(s) thereby improving the safety factor of securing that load.

It is another object to provide a rewinding device that can be used on most all flat bed trailer winches currently in common use. This way, when drivers switch trailers the rewinding devices may be retrofit to their new truck.

It is another object to provide a device that will remain securely attached to the winch drum until willfully released by the driver. If the operator wishes to let go of the winding device to tighten or untangle the strap during the rewinding process, he should be able to do so without fear of the device falling on the ground. Even if the driver should forget the device and drive off with it still attached, the device should stay attached and not fall out on the way.

It is another object to employ a rewinding device with a flexible joint to apply rotation to the winch drum to avoid hitting the driver's knuckles on the trailer edge and/or accessing a winch positioned close to an obstruction .

According to the present invention, the above-described and other objects are accomplished by providing a device for rewinding load straps onto a winch drum of a conventional load strap winch assembly. The rewinding device generally includes a spindle member adapted for axial insertion inside the hollow of the existing winch drum (of the load strap winch assembly). The spindle includes a locking member such as a detent pin that is adapted for engagement with the winch drum once the spindle member is inserted fully therein.

In addition, a spindle driver such as a hand crank or motor drive is coupled to the spindle for the purpose of applying rotational motion to the winch drum via the spindle.

The detent pin is adapted for radial outward movement to engage the winch drum, thereby causing the winch drum to rotate simultaneously with the spindle when rotational motion is applied by the hand crank/motor drive.

The detent pin is spring loaded and may be formed as a unitary member having a section of smaller diameter and a section of larger diameter, and a bore hole formed centrally along a major axis from the end of the larger diameter section almost to the end of the smaller diameter section. An extension spring may be seated in the bore hole. The extension spring biases the detent pin against the termination of the spindle hole and causes the detent pin to extend sufficiently to engage a winch bar hole on a winch drum when the spindle is inserted within the hollow of said winch drum. The detent pin is secured within the spindle by a retaining collar sized with an inner diameter to fit over the smaller section of the engagement pin, and an outer diameter to fit tightly in the spindle hole. The hand crank/motor drive may be connected directly to the spindle or through a flexible joint, and the motor drive may additionally be coupled through a right-angle drive gear.

BRIEF DESCRIPTION OF DRAWINGS

Other objects, features, and advantages of the present invention will become more apparent from the following detailed description of the preferred embodiment and certain modifications thereof when taken together with the accompanying drawings in which.

BEST MODEL(S) FOR CARRYING OUT THE INVENTION

The truck strap rewinding device of the present invention is herein described with reference to the foregoing drawings wherein like parts are similarly designated as follows:

| | |
|---|---|
| 10 spindle | 40 right angle drive |
| 12 spindle hole | 42 right angle drive output shaft |
| 16 engagement pin hole | 44 right angle drive input shaft |
| 18 extension spring | 46 small crank weld |
| 20 engagement pin | 48 small hand crank |
| 22 retaining collar | |
| 24 spindle to flexible joint weld | |
| 26 flexible joint | |
| 28 large hand crank | |
| 30 crank to flexible joint weld | |
| 32 load winch | |
| 34 winch drum | |
| 36 winch bar hole | |
| 38 motor | |

Figure 1A:
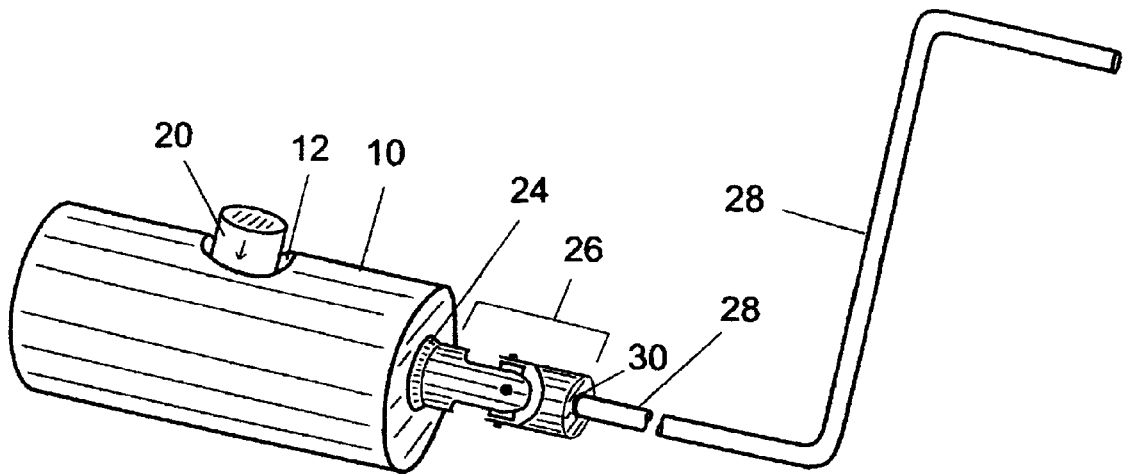
FIG. 1A shows a side perspective view of the invention with the engagement pin 20 fully extended.

FIG. 1A shows a perspective view of a preferred embodiment of the present invention. A spindle 10, with spindle hole 12 containing engagement pin 20, is connected to flexible joint 26 by weld 24. Weld 30 attaches hand crank 28 to flexible joint 26.

Figure 1B:
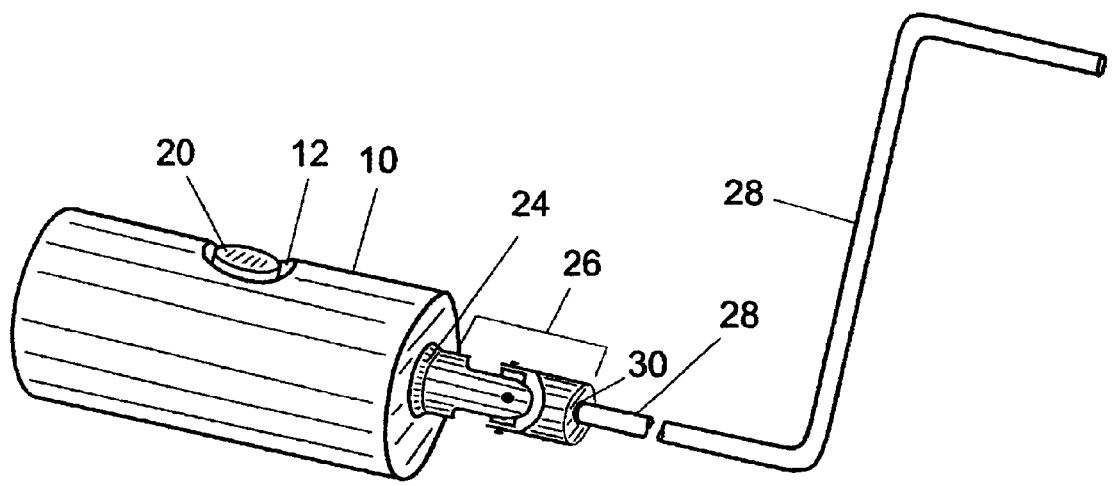
FIG. 1B shows a side perspective view of the invention with the engagement pin 20 pressed inward so that it is flush with the surface of spindle 10.

FIG. 1B shows a side perspective view of a typical embodiment of the present invention with engagement pin depressed inward.

Figure 2:
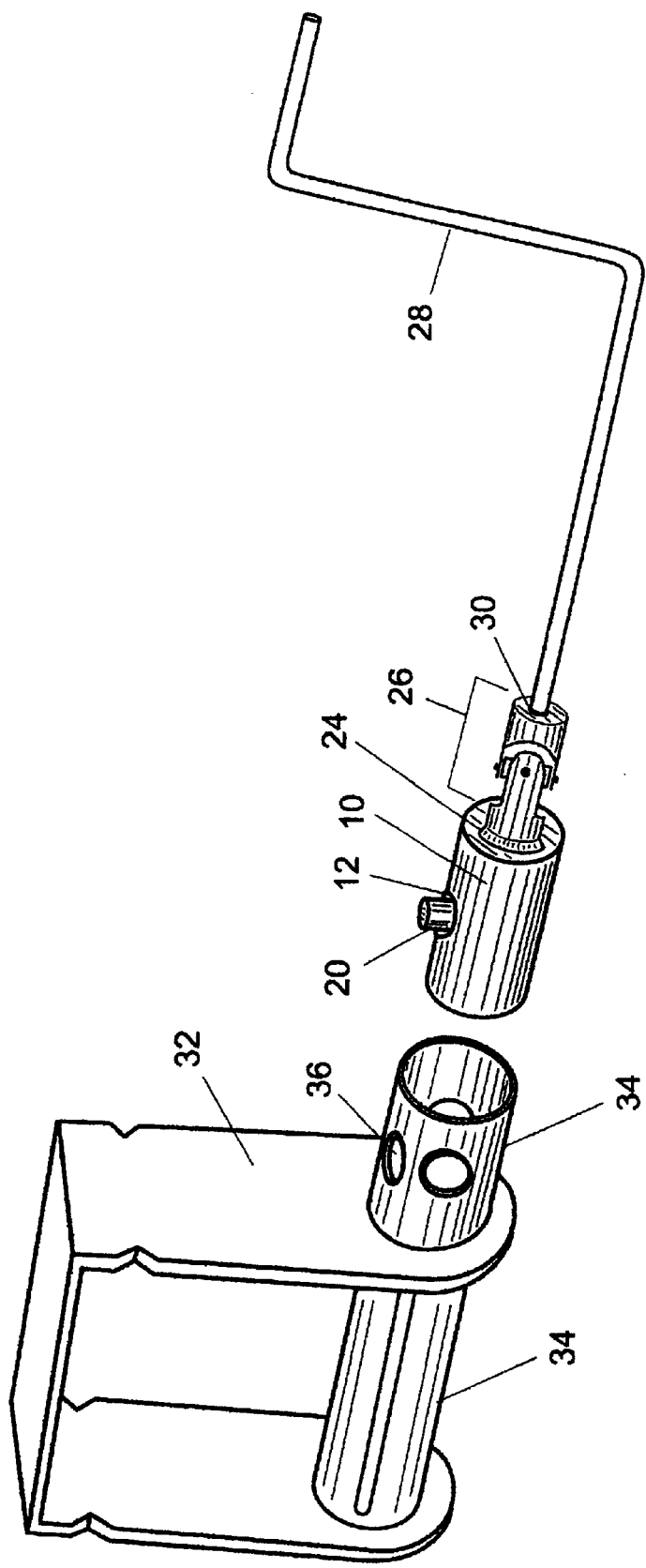
FIG. 2 shows a side perspective view of the invention next to a typical winch 32 on which it will be used.

FIG. 2 shows a side perspective view of a preferred embodiment of the invention next to a typical winch 32 that it will operate. Winch 32 contains winch drum 34. Winch drum 34 contains winch bar holes 36 that are adapted to cooperate with the customary tightening bars that are used to tighten the winch strap (not shown) when securing a load. The spindle 10 of present invention is positioned proximate to winch drum 34 prior to being inserted inside winch drum 34.

Figure 3:
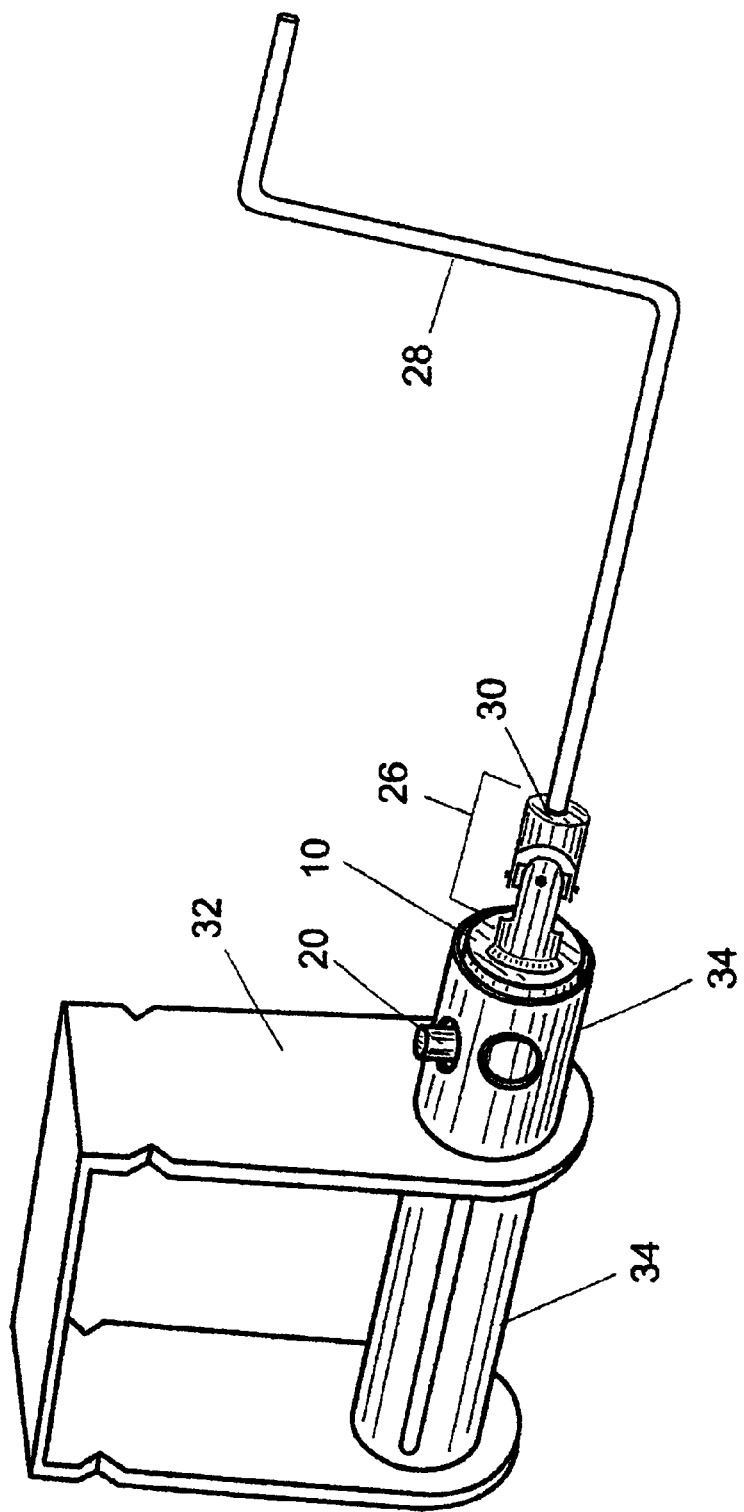
FIG. 3 shows a side perspective view of the invention in its operating position; inserted into a typical winch 32 on which it will be used.

FIG. 3 shows a side perspective view of a preferred embodiment of the invention inside the winch drum of a typical winch 32 and ready for operation. Note that the spindle 10 of the present invention is positioned inside winch drum 34 with engagement pin 20 engaged in winch bar hole 36.

Figure 4A:
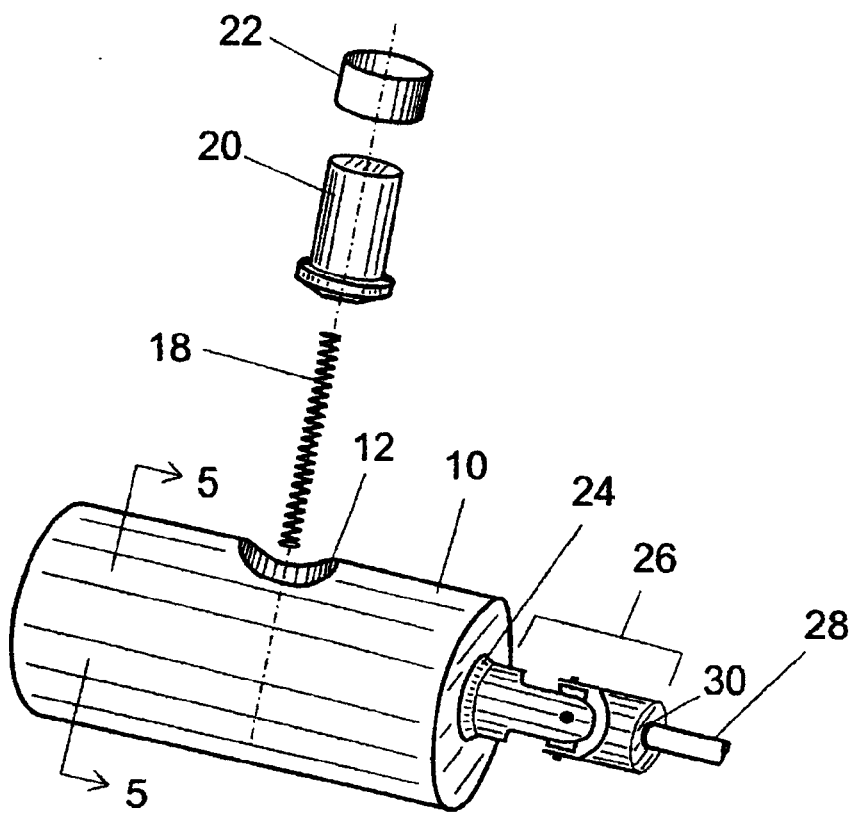
FIG. 4A shows an exploded side perspective view of the spindle 10 with its component parts and construction.

FIG. 4A shows an exploded side perspective view of a preferred embodiment of the spindle 10 of the present invention and its component parts. Spindle 10 is long enough to provide longitudinal stability once inside the winch drum (approximately 75 mm long) and of a diameter so as to easily fit longitudinally inside winch drum 34. Engagement pin 20 projects far enough outside the spindle to reliably catch in one of the winch bar holes 36, and is of sufficient diameter to transmit the necessary torque. Engagement pin 20 is retained in spindle hole 12 by retaining collar 22 which easily slips over the smaller diameter portion of engagement pin 20 but will not allow the larger diameter portion of engagement pin 20 to pass. Retaining collar 22 is pressed down into hole 12 so the top of the collar is flush with the outer surface of spindle 10. Collar 22 is retained in spindle 10 by a tight friction fit in hole 12 or by peening the top of spindle hole 12 once the collar is in place.

In the preferred embodiment, one end of extension spring 18 rests at the bottom of hole 12 naturally centered in the deepest portion of the spindle hole formed by the point of the drill used to form spindle hole 12, the other end of spring 18 extends up inside engagement pin hole 16 former in engagement pin 20. Engagement pin hole 16 is large enough in diameter to accommodate spring 18 and long enough to allow compressed spring 18 o totally fit within engagement pin hole 16 when the interior end of engagement pin 20 is forced to the bottom of spindle hole 12. Flexible joint 26 is attached to the center of one end of spindle 10 by any convenient means such as weld 24. An alternative to weld 24 would be a pin or set screw (not shown) through both spindle 10 and an extension of flexible joint 26 inside spindle 10. Flexible joint 26 could also be formed integral with spindle 10. Weld 30 secures one end of hand crank 28 to the other end of flexible joint 26. An alternative to weld 30 would be a pin or set screws (not shown) through flexible joint 26 and crank 28.

Figure 4B:
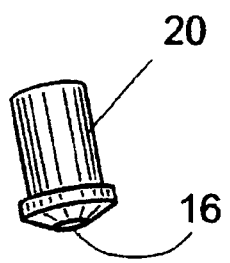
FIG. 4B shows a side perspective view of the engagement pin oriented so the location of engagement pin hole 16 can be seen.

FIG. 4B shows a side perspective view of engagement pin 20 showing engagement pin hole 16 at the larger diameter end of engagement pin 20. Engagement pin hole 16 extends almost to the opposite end of engagement pin 20 and accommodates extension spring 18 as in FIG. 4A.

Figure 5:
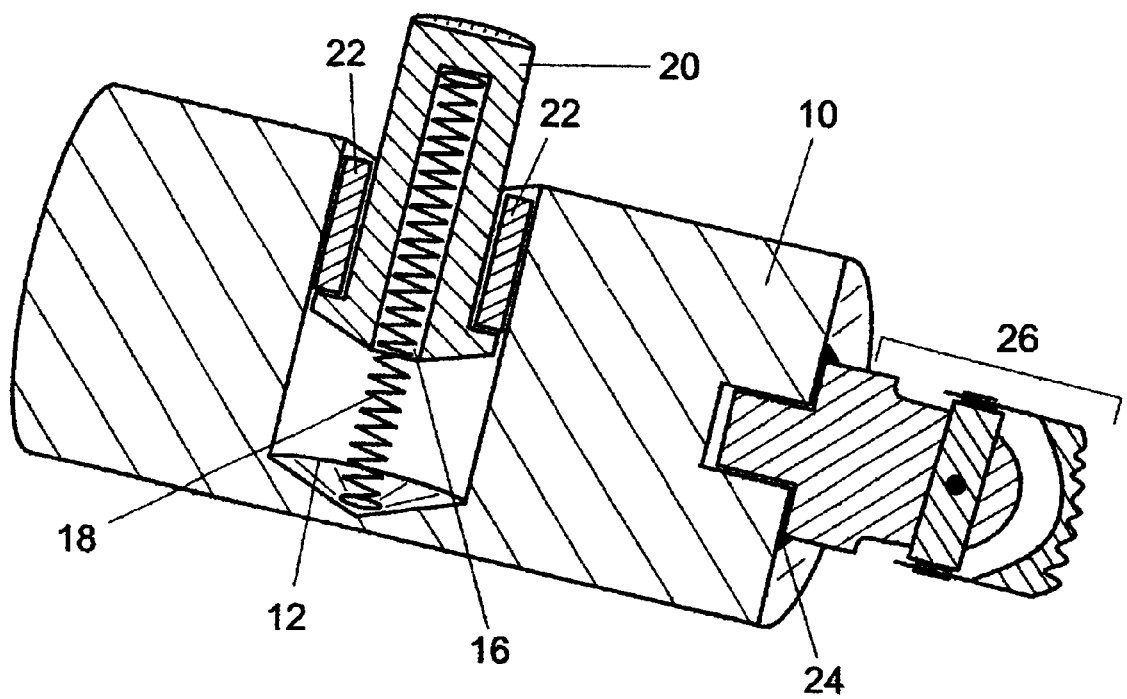
FIG. 5 shows a side perspective cut-away view of spindle 10 with its component parts and construction.

FIG. 5 is a side cut-a-way view of spindle 10 showing engagement pin 20 retained in spindle hole 12 by retaining collar 22. Extension spring 18 pushes engagement pin 20 outward until the larger diameter section of engagement pin 20 rests against retaining collar 22. Flexible joint 26 is attached to spindle 10 by weld 24.

In operation of the device shown in FIGS. 1–5, engagement pin 20 is depressed against the force of extension spring 18 until the exterior end of engagement pin 20 is approximately flush with the exterior surface of spindle 10. With engagement pin 20 depressed, spindle 10 is inserted into the end of winch drum 34 until engagement pin 20 is contained inside winch drum 34. Spindle 10 is moved further inside winch drum 34 and rotated to allow engagement pin 20 to pop up and engage one of the winch bar holes 36 typically found in winch drum 34. The hand crank 28 is now operated to wind up the strap onto winch drum 34. The spindle is removed by inserting one's finger or a suitable tool into the winch bar hole 36 and depressing engagement pin 20 far enough to allow spindle 10 to be extracted from winch drum 34. This process is repeated as often as necessary to wind all remaining straps.

An alternative to the large hand crank 28 would be a motor.

Figure 6:
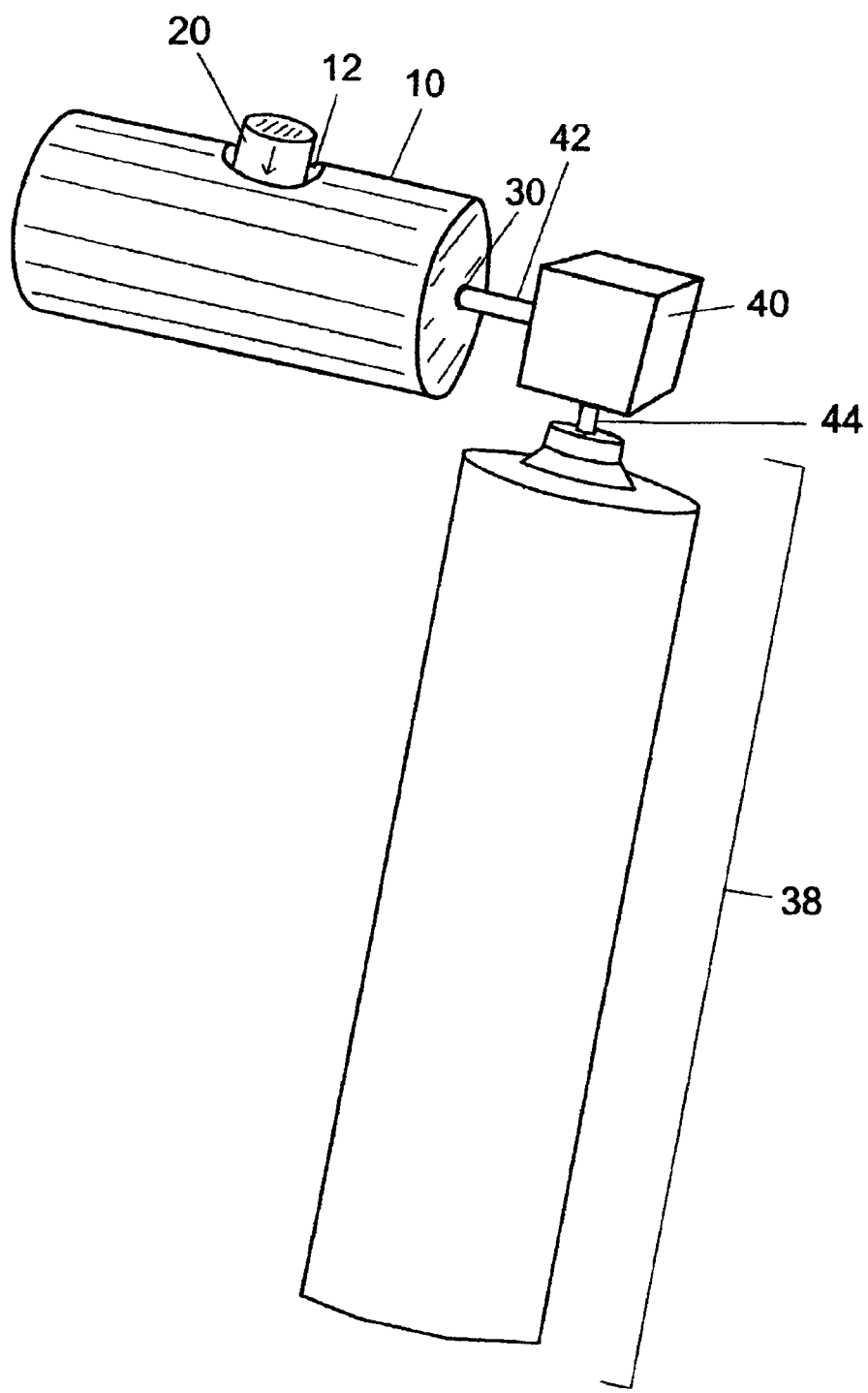
FIG. 6 shows a side perspective view of an alternate embodiment where the spindle 10 is turned directly with a motor 38.

FIG. 6 shows a side perspective view of an alternate embodiment where a motor 38 provides rotation through right angle drive input shaft 44 to right angle drive 40 which translates the force approximately 90 degrees to right angle drive output shaft 42 attached by weld 30 to spindle 10, thereby causing spindle 10 to rotate along with engagement pin 20. The motor 38 may, for instance, be a commercially available cordless electric screwdriver or drill motor connected to right angle drive input shaft 44 for providing torque to right angle drive 42, which in turn provides the torque to right angle drive output shaft 42. Shaft 42 may be connected directly to spindle 1 as shown. Right angle drive 40 may be formed integrally with motor 38. The right angle drive 40 provides more leverage to transmit the torque and allows the entire device to more likely fit into the winch drum when obstrutions such as other winches or portions of the trailer are positioned close to the winch being rewound.

Figure 7:
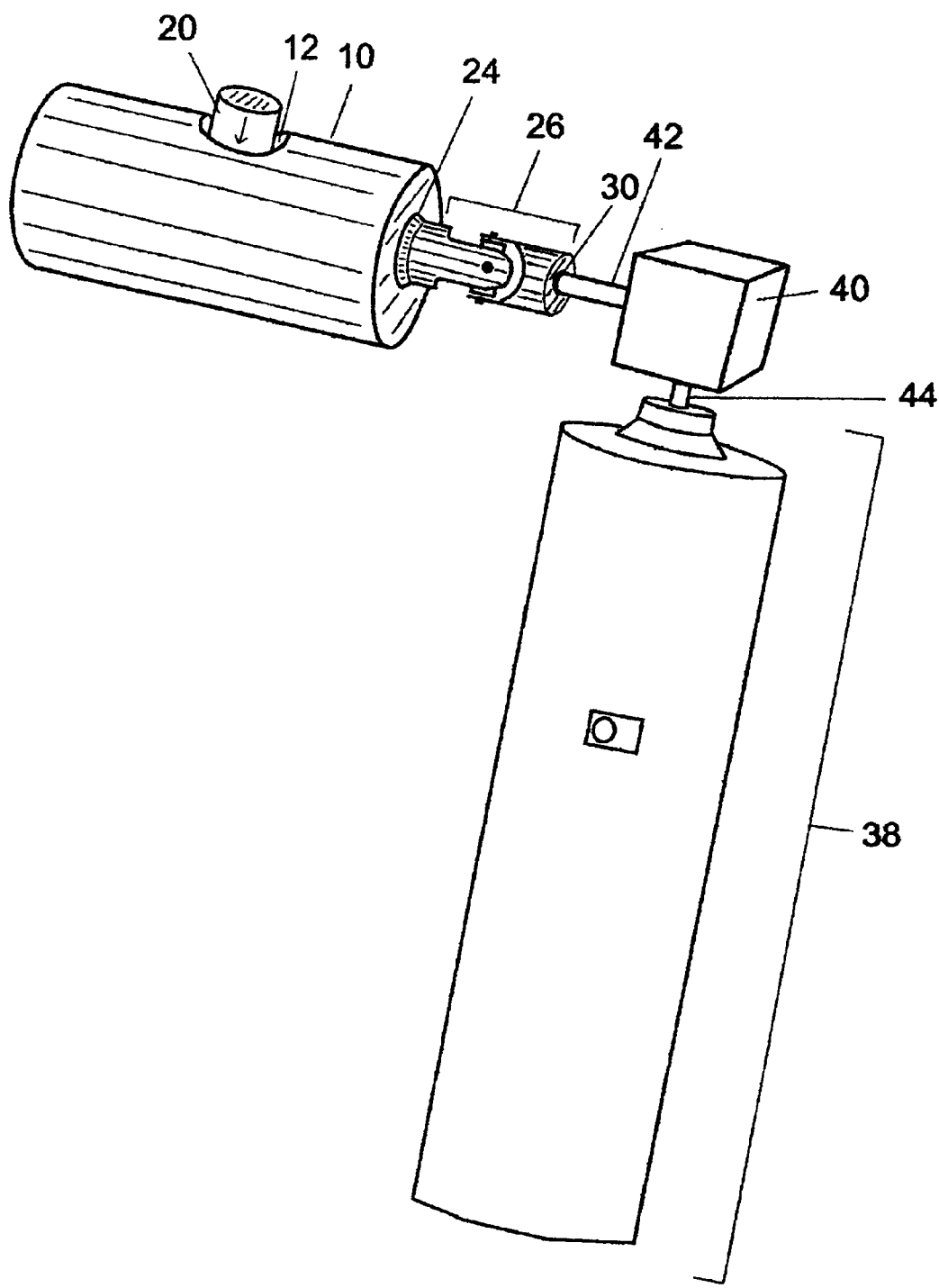
FIG. 7 shows a side perspective view of an alternate embodiment where the spindle is turned with a motor through a flexible joint.

FIG. 7 shows a side perspective view of an alternate embodiment where motor 38 provides rotation through right angle drive input shaft 44 to right angle drive 40, and on through right angle drive output shaft 42. In this embodiment, right angle drive output shaft 42 is attached by weld 30 to flexible joint 26.

Another alternative to the large hand crank 28 attaching to spindle 10 through flexible joint 26 would be a shorter hand crank fixed directly to spindle 10 by weld 46 or other suitable means.

Figure 8:
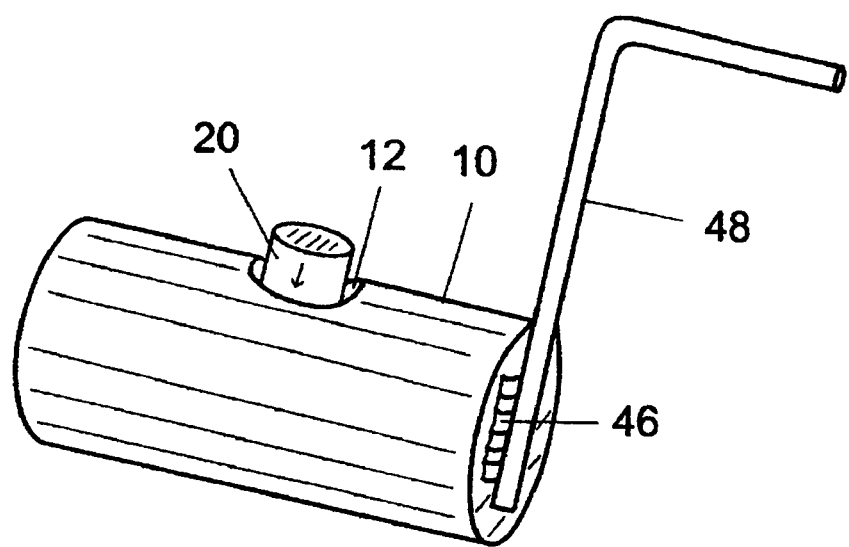
FIG. 8 shows aside perspective view of an alternate embodiment where the hand crank 48 is attached directly to spindle 10.

FIG. 8 shows a side perspective view of an alternative arrangement of spindle 10 with engagement pin 20, powered by a small hand crank 48 which is directly attached by weld 46 to spindle 10. For most truck winch mountings, the smaller integral hand crank 48 will provide a smaller turning radius (preferably in the range of about seven centimeters), and this will avoid causing the operator's knuckles from striking the edge of the trailer.

In respect to all of the above-described embodiments the reader will see that the winch winding device of the present invention can be used to quickly and safely rewind the straps commonly used to secure loads on flat bed trucks when not in use. The device provides a more natural physiological motion for the driver's hands during the rewinding process than grabbing and twisting the winch drum directly as is the current practice. This decreases the damage some drivers experience after performing this winding directly for many years. Furthermore, this strap rewinding device has the additional advantages that it facilitates winding the load straps on the same winch used to hold the load, thereby eliminating the need for a separate rewinding winch and storing loose coils of straps. The device has been shown to save drivers several minutes per load, thereby increasing productivity. Moreover, the device may be readily retrofitted to existing trailers and can be transferred from trailer to trailer making it convenient for the driver to use one device on multiple trailers. Moreover, the locking action of the engagement pin 20 requires willful removal from the winch drum, and this prevents accidental loss should the driver wish to momentarily let go of the device to tighten or untwist the strap.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

INDUSTRIAL APPLICABILITY

Typical flat bed trucks employ a number of load straps each coiled onto a winch that are used for securing loads on the flat bed trailer during travel. A flat bed trailer may have as many as twelve straps each measuring twenty-seven feet in length and coiled onto winch drums positioned around the sides of the flat bed. After these load straps have been unwound and used to secure a load for delivery, they must all be rewound again in order to secure the vehicle for travel. For most drivers, the only previous way to rewind the load straps was by grasping the round winch drum and twisting it using wrist motion. This is exceedingly slow and often causes injury to the forearm over time. There are a variety of tightening bars on the market that are used to tighten winch straps around a load, but these are slow and impractical for rewinding loose straps. The tightening bars must be repeatedly removed and re-inserted for each partial revolution of the winch drum. Moreover, the mounting of the winch close to the edge of the trailer often leaves very little radial clearance around the winch drum and the positioning along the trailer may place it very close to another winch or part of the trailer, restricting access directly in front of the axial opening of the winch drum. Accordingly, there is a significant commercial need for a winch winding device that can be used to quickly and safely rewind the load straps, and especially to facilitate winding the load straps on the same winch used to hold the load, thereby eliminating the need for a separate rewinding winch and storing loose coils of straps.

What is claimed is:

1. In combination with a conventional load strap winch assembly comprising a hollow winch drum having a radial hole into the hollow of said drum, a device attachable thereto for the purpose of rewinding load straps onto the winch drum, comprising:

a cylindrical spindle member adapted for axial insertion inside the hollow of the existing winch drum of the load strap winch assembly, said spindle including a locking detent member adapted for radial outward movement for engagement with the hole in said winch drum once the spindle member is inserted fully therein, and a spindle driver coupled to said spindle for the purpose of applying rotational motion to said winch drum via said spindle.

2. The device for rewinding load straps according to claim 1, wherein said locking member is adapted for radial outward movement to engage the winch drum, which shall then cause the winch drum to rotate simultaneously with the spindle when rotational motion is applied to an end of said spindle by said driver.

3. The device for rewinding load straps according to claim 2, wherein said locking member further comprises a spring loaded engagement pin.

4. The device for rewinding load straps according to claim 3, wherein said spring loaded engagement pin further comprises a unitary member having a section of smaller diameter and a section of larger diameter, and a bore hole formed centrally along a major axis from the end of the larger diameter section almost to the end of the smaller diameter section, whereby said bore hole is adapted for containing an extension spring.

5. The device for rewinding load straps according to claim 4, wherein said spindle is a cylindrical member formed with a spindle hole extending diametrically from a position on an outer surface thereof almost to but not exiting the opposite spindle surface, said spindle hole being of sufficient size to slidably accommodate said engagement pin.

6. The device for rewinding load straps according to claim 5, further comprising an extension spring contained in the bore hole of the engagement pin and biased against the termination of the spindle hole, said extension spring causing the engagement pin to extend sufficiently to engage a winch bar hole on a winch drum when the spindle is inserted within the hollow of said winch drum.

7. The device for rewinding load straps according to claim 6, further comprising a retaining collar sized with an inner diameter to fit over the smaller section of the engagement pin, and an outer diameter to fit tightly in the spindle hole, thereby serving to restrain the larger diameter section of the engagement pin within the spindle.

8. The device for rewinding load straps according to claim 1, further comprising a hand crank coupled to one end of said spindle for the purpose of applying rotational motion.

* * * * *